US009582720B2

(12) United States Patent
Gupta et al.

(10) Patent No.: US 9,582,720 B2
(45) Date of Patent: Feb. 28, 2017

(54) IMAGE-BASED INDOOR POSITION DETERMINATION

(71) Applicant: QUALCOMM Incorporated, San Diego, CA (US)

(72) Inventors: Rajarshi Gupta, Sunnyvale, CA (US); Saumitra Mohan Das, Santa Clara, CA (US); Hui Chao, San Jose, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/673,147

(22) Filed: Mar. 30, 2015

(65) Prior Publication Data

US 2015/0227794 A1  Aug. 13, 2015

Related U.S. Application Data

(63) Continuation of application No. 13/757,645, filed on Feb. 1, 2013, now Pat. No. 9,020,191.

(Continued)

(51) Int. Cl.
*A63B 67/00* (2006.01)
*G06K 9/00* (2006.01)
(Continued)

(52) U.S. Cl.
CPC ....... *G06K 9/00664* (2013.01); *G06K 9/6202* (2013.01); *G06T 7/0046* (2013.01)

(58) Field of Classification Search
USPC ....... 382/100, 103, 106–107, 123, 154, 162, 382/168, 173, 181, 190, 199, 209, 219,
(Continued)

(56) References Cited

U.S. PATENT DOCUMENTS 7,042,451 B2  5/2006  Venkataraman et al.
2011/0081919 A1*  4/2011  Das .................... G01C 21/20
455/456.1

(Continued)

FOREIGN PATENT DOCUMENTS

JP        2005318401 A     11/2005
JP        2007135115 A      5/2007
WO   WO-2006001129 A1      1/2006

OTHER PUBLICATIONS

Kebler C., et al., "Multi-Sensor indoor pedestrian navigation system with vision aiding", Gyroscopy and Navigation Apr. 2012 MAIK NAUKA RUS, vol. 3, No. 2, Apr. 2012 (Apr. 2012), pp. 79-90, XP055105969, DO I: 1 0.1134/$20751 08712020058.*

(Continued)

*Primary Examiner* — Seyed Azarian
(74) *Attorney, Agent, or Firm* — Berkeley Law & Technology Group, LLP

(57) ABSTRACT

In one implementation, a method may comprise: determining a topological representation of an indoor portion of a building based, at least in part, on positions or number of lines in an image of the indoor portion of the building; and comparing the topological representation to one or more stored topological representations, for example in a digital map of the building, to determine a potential position of the indoor portion of the building.

30 Claims, 9 Drawing Sheets

Related U.S. Application Data

(60) Provisional application No. 61/732,233, filed on Nov. 30, 2012.

(51) Int. Cl.
*G06K 9/62* (2006.01)
*G06T 7/00* (2006.01)
*H04W 24/00* (2009.01)

(58) Field of Classification Search
USPC ............... 382/232, 254, 263–264, 274–276, 382/285–298, 305, 312; 455/456.1, 455/456.2; 703/2; 701/425; 463/42, 53
See application file for complete search history.

(56) References Cited

U.S. PATENT DOCUMENTS

| | | | |
|---|---|---|---|
| 2011/0187704 A1 | 8/2011 | Chen et al. | |
| 2011/0246148 A1* | 10/2011 | Gupta | H04W 64/00 703/2 |
| 2011/0282897 A1 | 11/2011 | Li et al. | |
| 2011/0287784 A1* | 11/2011 | Levin | H04W 64/00 455/456.2 |
| 2012/0166077 A1* | 6/2012 | Herzog | G01C 21/3652 701/425 |
| 2013/0281111 A1* | 10/2013 | Syrjarinne | H04W 64/00 455/456.1 |
| 2014/0153773 A1 | 6/2014 | Gupta et al. | |

OTHER PUBLICATIONS

Kessler C., et al., "Multi-Sensor indoor pedestrian navigation system with vision aiding", Gyroscopy and Navigation Apr. 2012 MAIK NAUKA RUS, vol. 3, No. 2, Apr. 2012 (Apr. 2012), pp. 79-90, XP055105969, DO I: 1 0.1134/$20751 08712020058.*

Ishikawa T., et al., "Indoor Pedestrian Tracking System Based on Synergistic Service Linkages," Technical Report of the Institute of Electronics, Information and Communication Engineers (IEICE), Japan, IEICE, Jan. 14, 2010, vol. 109, No. 376, pp. 249-254.

Katahira T., et al., "Location Identification by hybrid sensing," Technical Report of the Institute of Electronics, Information and Communication Engineers, Japan (IEICE), Japan, IEICE, Nov. 20, 2008, vol. 108, No. 328, pp. 185-192.

Kitazume M., et al., "Localization Using Image of Mobile Phone Camera," ITE Technical Report, Japan, The Institute of Image Information and Televison Engineers, Sep. 24, 2009, vol. 33, No. 36, pp. 15-20.

Lu L., et al., "An Approach of Active Indoor Positioning Using Smartphone for Mobile LBS," Telecommunications Science, 2012, vol. 28, issue. 6, pp. 98-103.

Okuma T., et al., "Ego-motion tracking system for seamless combination of indoor navigation and augmented reality exhibits," IPSJ SIG Technical Reports, Entertainment Computing (EC), Japan, The Information Processing Society of Japan (IPSJ), Jun. 15, 2012, No. 24, pp. 1-6.

Saeki M., et al., "A Study on a Pedestrian Navigation System Using Model-Based Matching," Proceedings of the 68th National Conference (3), Japan, The Information Processing Society of Japan, Mar. 7, 2006, pp. 3-481-3-482.

Xin M.A., et al., "Mobile Robot Topological Map Building Based on Thinning Algorithm," Computer Technology and Development, Oct. 2009, vol. 19, No. 10, 4 pages.

Yu-Xia S., et al., "Non-Complete Topological Analysis in Image-Based 3D Building Reconstruction", Apr. 30, 2012, 4 pages.

Ascher C., et al., "Multi-floor map matching in indoor environments for mobile platforms", Indoor Positioning and Indoor Navigation (IPIN), 2012 International Conference on, IEEE, Nov. 13, 2012 (Nov. 13, 2012), pp. 1-8, XP032313234, DOI: 10.11 09/IPIN.2012. 6418928 ISBN: 978-1-4673-1955-3.

International Search Report and Written Opinion—PCT/US2013/ 072445, International Search Authority—European Patent Office, Mar. 21, 2014.

Kessler C., et al., "Multi-Sensor indoor pedestrian navigation system with vision aiding", Gyroscopy and Navigation Apr. 2012 MAIK NAUKA RUS, vol. 3, No. 2, Apr. 2012 (Apr. 2012), pp. 79-90, XP055105969, DO I: 1 0.1134/S20751 08712020058 .

Kuusniemi H., et al., "Multi-sensor multi-network seamless positioning with visual aiding", Localization and GNSS (ICL-GNSS), 2011 International Conference on, IEEE, Jun. 29, 2011 (Jun. 29, 2011), pp. 146-151, XP031896269, DOI: 10.11 09/ICL-GNSS. 2011.5955257 ISBN: 978-1-4577-0186-3.

Hideyuki K., et al., "The Position of the Camera Position and Posture Estimation of the Continuity from the Moving Image and the GPS by the Bundle Adjustment that Takes into Account",Meeting on Image Recognition and Understanding (MIRU) Proceedings, pp. 825-830, Jul. 2011.

* cited by examiner

IMAGE-BASED INDOOR POSITION DETERMINATION

CROSS REFERENCE TO RELATED APPLICATIONS

This application is a continuation of U.S. patent application Ser. No. 13/757,645 entitled "Image-Based Indoor Position Determination," filed Feb. 1, 2013, which claims priority under 35 U.S.C. §119(e) from U.S. Provisional Patent Application No. 61/732,233 entitled "Image-Based Indoor Position Determination," filed Nov. 30, 2012, the entire contents of both of which are incorporated herein by reference.

BACKGROUND

Field

The subject matter disclosed herein relates to wireless communication systems, and more specifically, to position determination methods and apparatuses for use with and/or by wireless mobile stations.

Information

GPS and other like satellite positioning systems have enabled navigation services for mobile handsets in outdoor environments. Since satellite signals may not be reliably received or acquired in an indoor environment, different techniques may be employed to enable navigation services. For example, mobile stations may obtain a position fix by measuring ranges to three or more terrestrial wireless access points that are positioned at known locations. Such ranges may be measured, for example, by obtaining a MAC ID address from signals received from such access points and obtaining range measurements to the access points by measuring one or more characteristics of signals received from such access points such as, for example, signal strength and round trip delay.

A navigation system may provide navigation assistance or mapped features to a mobile station, for example, as it enters a particular area. In some implementations, an indoor navigation system may selectively provide assistance information to mobile stations to facilitate and/or enable location services. Such assistance information may include, for example, information to facilitate measurements of ranges to wireless access points at known fixed locations. For example, "radio heatmap" data indicating expected received-signal-strength-indicator (RSSI) or round-trip time (RTT) values associated with access points may enable a mobile station to associate signal measurements with locations in an indoor area. By matching measured RSSI or RTT values of acquired signals marked with particular MAC IDs with the RSSI or RTT values expected for signals marked by these particular MAC IDs at a specific location, the location of the receiver may be inferred to be at the specific location.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
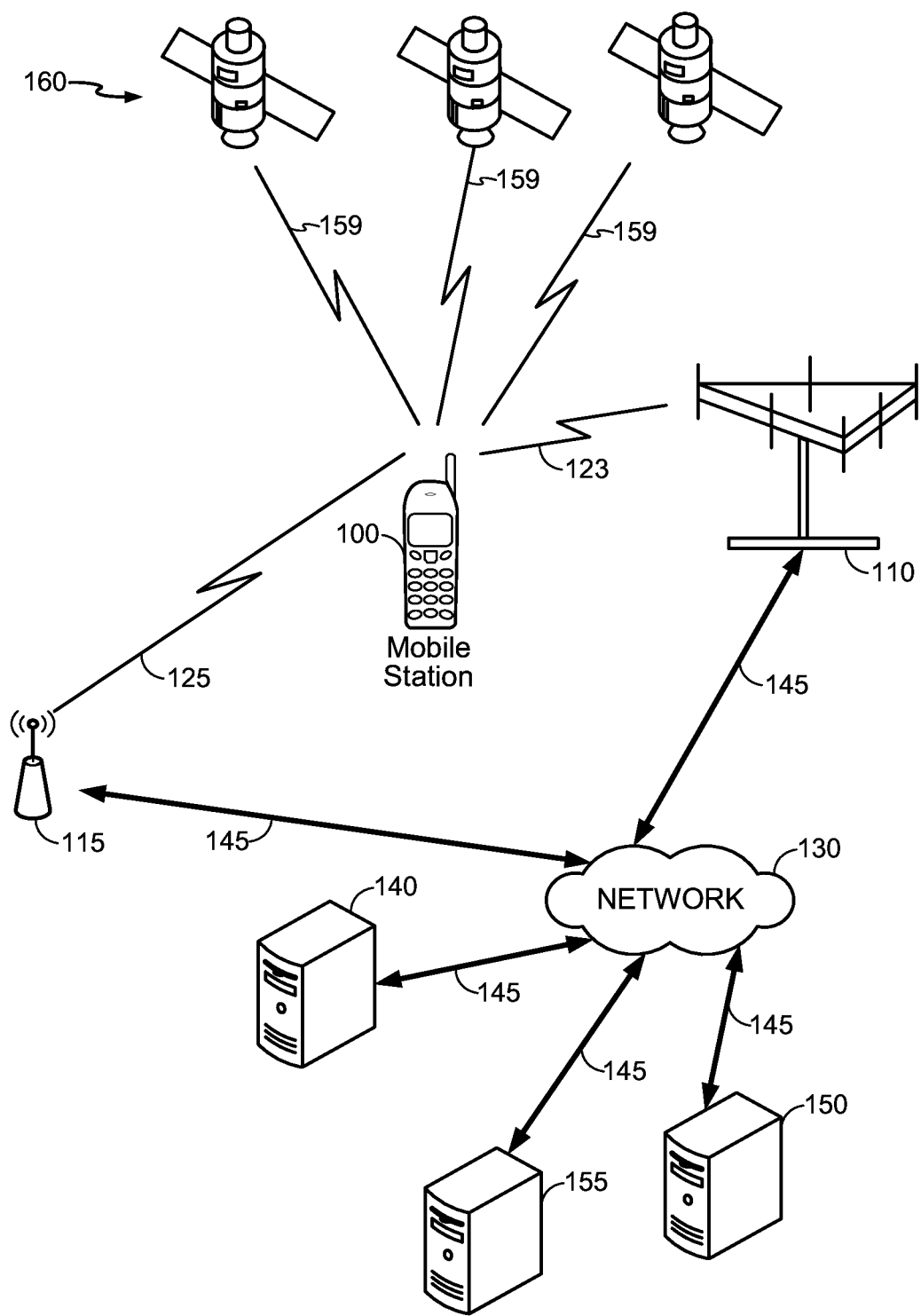
FIG. 1 is a system diagram illustrating certain features of a system containing a mobile station, in accordance with an implementation.

In some implementations, a method may comprise: extracting linear features from an image of an indoor portion of a building, the image captured by a camera at a mobile station; determining a topological representation of the indoor portion based, at least in part, on positions or quantity of the linear features in the image; and comparing the topological representation to stored topological representations of the building to determine a candidate position of the mobile station.

In other implementations, an apparatus may comprise: means for extracting linear features from an image of an indoor portion of a building, the image captured by a camera at a mobile station; means for determining a topological representation of the indoor portion based, at least in part, on positions or quantity of the linear features in the image; and means for comparing the topological representation to stored topological representations of the building to determine a candidate position of the mobile station.

In still other implementations, an apparatus may comprise: one or more processing units configured to: extract linear features from an image of an indoor portion of a building, the image captured by a camera at a mobile station; determine a topological representation of the indoor portion based, at least in part, on positions or quantity of the linear features in the image; and compare the topological representation to stored topological representations of the building to determine a candidate position of the mobile station.

In yet other implementations, a non-transitory storage medium may comprise machine-readable instructions stored thereon that are executable by a special purpose computing device to: extract linear features from an image of an indoor portion of a building, the image captured by a camera at a mobile station; determine a topological representation of the indoor portion based, at least in part, on positions or quantity of the linear features in the image; and compare the topological representation to stored topological representations of the building to determine a candidate position of the mobile station.

In some embodiments, a method may comprise obtaining an image captured at a mobile device of at least a region of an area, determining a quantity or position of doorways in the region based on the image, comparing the determined quantity or position to a topology of at least a portion of the area, and determining a potential position of the region within the area based at least in part on the comparing. In some embodiments, determining the doorways is based on approximately parallel lines within the image. In some embodiments, the region comprises a hallway, and the comparing comprises comparing a quantity of doorways on each side of the hallway to the topology. In some embodiments, the determining comprises determining a vanishing point based on linear features in the image, and the determined quantity of doors on each side of the hallway is based at least in part on the determined vanishing point. In some embodiments, the doorways comprise an entry to an enclosed area or an intersecting hallway. In some embodiments, the comparing is based on a distance between the determined positions of the doorways. In some embodiments, a plurality of potential positions may be determined, and an estimated position is determined based on the plurality of potential positions and measurements from one or more sensors at the mobile device other than the sensor which was used to capture the image.

DETAILED DESCRIPTION

Reference throughout this specification to "one example", "one feature", "an example" or "one feature" means that a particular feature, structure, or characteristic described in connection with the feature and/or example is included in at least one feature and/or example. Thus, the appearances of the phrase "in one example", "an example", "in one feature", or "a feature" in various places throughout this specification are not necessarily all referring to the same feature and/or example. Furthermore, the particular features, structures, or characteristics may be combined in one or more examples and/or features.

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile station which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." In some embodiments, a mobile station comprises a device omitting components and/or functionality for wireless communications.

Various techniques are described herein which may be implemented in one or more land-based computing platforms or a mobile station (MS), or a combination thereof, to obtain a position fix of an MS or to determine a location of an area captured in an image. In particular, for example, such techniques may be used to obtain an indoor position fix in an environment where wireless signals are attenuated or may not be available. A radio heatmap and wireless signals from land-based access point (AP) transmitters, as described below, for example, may comprise positioning assistance information to enable an MS to estimate its position. However, in an indoor environment, such wireless signals from AP transmitters may be unavailable to an MS located indoors where building structures (e.g., walls, floors, and so on) may attenuate or block wireless signals from reaching the MS. Similarly, wireless signals from satellites used for global positioning system navigation may also be unavailable to receivers indoors.

In one implementation, obtaining a position fix of an MS may involve capturing images of particular three-dimensional objects and extracting three-dimensional features from the images. Such extracted three-dimensional features may be correlated with two-dimensional features on a map or routeability graph. For example, by performing such a correlation, a determination may be made as to where on a map the particular three-dimensional objects may be located. Three-dimensional features of an indoor space, such as a hallway, for example, may include a number of doors, doorways, stairs, hall lights, wall corners, floor or ceiling tiles, and so on. In other words, such three-dimensional features of an indoor space may include any of a number of objects that may be identified by a map. Accordingly, three-dimensional features may further include office-space cubicle structures or furnishings in an office space, which may be detailed in a map, for example.

In an implementation, three-dimensional features may be extracted from an image by a process involving identifying or inferring shapes or sizes of three-dimensional objects from lines, curves, or other shapes formed by edges of the objects in a captured image. For example, an image captured of a doorway may include lines forming a rectangle corresponding to edges of the doorway. Conversely then, an inference may be made that a rectangle in an image may correspond, among other things, to a doorway. In another example, in the case of capturing an image of a doorway from an angle (e.g., with respect to the plane of the doorway), the image may include lines forming a trapezoid corresponding to edges of the doorway. Conversely then, an inference may be made that a trapezoid in an image may correspond, among other things, to a doorway. In one implementation, a process involving identifying or inferring shapes or sizes of three-dimensional objects from lines formed by edges of the objects in a captured image may be performed by a processor executing code, for example. Such a processor may be located at an MS co-located with a camera or at a land-based server that may wirelessly communicate with an MS, for example.

In an implementation, as mentioned above, an image may include a plurality of variously-sized lines, curves, or other shapes or patterns at various angles to one another. A process, as described above, for example, may be used to infer (e.g., extract) multiple three-dimensional features based, at least in part, on the plurality of such variously-sized lines, curves, or other shapes or patterns. For example, a plurality of variously-sized lines, curves, or other shapes or patterns in an image may allow for an inference that the image is of a hallway with two doors on the left and three doors on the right. A map may identify one or more candidates for such a hallway. Accordingly, a determination may be made that the image was captured (e.g., location of a camera that captured the image) at any one of the candidate positions. Further details in the image or other information acquired near the camera, may allow for elimination of all but one candidate position so that a unique position may be determined.

As described above, for example, extracted three-dimensional features of an indoor space may be based, at least in part, on a number or arrangement of linear features or other shapes in a captured image of the indoor space. Because a number or arrangement of such linear or other shaped features may be unique to a particular indoor space, one or more extracted three-dimensional features of the indoor space may act as a "fingerprint" to identify the particular indoor space. For example, upon or after capturing an image of a particular indoor space, an MS may extract three-dimensional features of the particular indoor space. The MS may then compare the extracted three-dimensional features of the particular indoor space to a number of stored topological representations of multiple indoor spaces covered by a digital map that includes the particular indoor space. Here, a "topological representation" may comprise any information, data, digital electronic signals, and/or other representation representing a particular geometrical arrangement of lines, line segments, curves, patterns, or symbols corresponding to features of an indoor space. In a particular example, a topological representation of a hallway having two doors on the left (in a captured image of the hallway) and one door on the right may comprise digital electronic signals that represent the hallway, the doors, and the relative positions of the doors.

Determining a match between extracted three-dimensional features of a particular indoor space and a stored topological representation of the indoor space in a digital map may allow an MS to determine a position of the particular indoor space. Accordingly, the MS, having captured the image while located in the particular indoor space, may determine its position. In this context, the term "match" refers to comparing a similarity of at least some features or characteristics of extracted three-dimensional features of a particular indoor space to at least one topological representations. Of course, such details of a topological representation are merely examples, and claimed subject matter is not so limited.

In another implementation, a three-dimensional feature extracted from an image may be considered to comprise a two-dimensional representation of the feature in the image, though claimed subject matter is not so limited. Thus, as described in an example above, a two-dimensional representation of an image of a doorway may comprise a trapezoid. An image may comprise multiple two-dimensional representations corresponding to multiple three-dimensional features captured in the image. In such a case, the two-dimensional representations may be arranged in particular positions relative to one another in the image. For example, an image of an indoor space may comprise multiple two-dimensional representations corresponding to a particular number of doorways on a right side of a hallway and a particular number of doorways on a left side of the hallway. Such two-dimensional representations of doorways may be arranged in particular positions relative to one another in an image based, at least in part, on the arrangement of the doors in the three-dimensional indoor space. In an implementation, any number of two-dimensional representations of three-dimensional features of an indoor space may be arranged in a substantially linear fashion. For example, as mentioned above, a two-dimensional representation of a doorway may comprise a trapezoid. In such a case, the trapezoid may include a portion corresponding to a top edge of the doorway. In an example of multiple doorways on one side of a hallway (e.g., left side or right side), two-dimensional representations of the individual doorways may comprise a portion of a trapezoid that corresponds to a top of the doorways. Such portions corresponding to multiple tops of multiple doorways may be arranged in a line. In another example, a two-dimensional representation of an intersection where a floor captured in an image meets a wall captured in the image may form a line. Similarly, a two-dimensional representation of an intersection where a ceiling captured in an image meets a wall captured in the image may form a line. In yet another example, two-dimensional representations of right or left edges of lights in a ceiling of a corridor captured in an image may be arranged in a line. As explained below, lines of such linear features captured in an image of an indoor space may be used to form a topological representation of the indoor space. For example, a topological representation of an indoor space may comprise information, data, and/or digital electronic signals representing a particular two-dimensional geometrical arrangement of lines, line segments, or symbols corresponding to three-dimensional features of the indoor space. In a particular example, a topological representation of a hallway having two doors on the left (in a captured image of the hallway) and one door on the right may comprise information, data, and/or digital electronic signals that represent the hallway, the doors, and the relative positions of the doors. While certain embodiments of two-dimensional topological representations are described above, those of skill in the art will appreciate that topological representations and/or other information regarding a topology are not limited to two dimensional representations. A topological representation or and/or other information regarding a topology or features of an area may comprise any type of information and/or be represented in any number of ways. For example, a topological representation may be one dimensional. In some embodiments, a hallway may be represented as a line having points or other demarcations where doors (right or left) are located. Similarly, merely a count of certain visible features (e.g., doorways) may be used as a representation in some embodiments. For example, a certain hallway may be represented by a quantity, such as the quantity 5 indicating that 5 doorways and/or intersecting hallways are visible.

Accordingly, a topological representation of an indoor space may be based, at least in part, on a number and/or arrangement of linear features of two-dimensional representations of three-dimensional features of the indoor space. Because a number or arrangement of such linear features may be unique to a particular indoor space, a topological representation of the indoor space may act as a "fingerprint" to identify the indoor space. For example, upon or after capturing an image of a particular indoor space, an MS may generate a topological representation of the particular indoor space. The MS may then compare the topological representation of the particular indoor space to a number of stored topological representations of multiple indoor spaces covered by a digital map that includes the particular indoor space. Determining a match between the topological representation of the particular indoor space and a stored topological representation of an indoor space in the digital map may allow the MS to determine a position of the particular indoor space. Accordingly, the MS, having captured the image while located in the particular indoor space, may determine its position. In this context, the term "match" refers to comparing a similarity of at least some features or characteristics of two or more topological representations. Of course, such details of a topological representation are merely examples, and claimed subject matter is not so limited.

Accordingly, a method of obtaining a position fix of an MS may include capturing an image of objects (e.g., doorways, floors, ceilings, and so on) of an indoor portion of a building in which the MS is located, and extracting linear features of representations of the objects from the image. A topological representation of the indoor portion may be generated based, at least in part, on positions or number of lines or linear features of representations in the captured image. Such a topological representation may be compared to one or more stored topological representations of a plurality of areas in a digital map of the building to determine a position of the indoor portion of the building (and thus the position of the MS at the time that it captured the image). For example, lines or linear features of two-dimensional representations in an image of a room, hall, or corridor may correspond to doorway edges or intersections between walls and floor or between walls and ceiling.

Various techniques described herein involving obtaining a position fix of an MS using a topological representation of an indoor position may occasionally produce multiple "candidate position fixes". For example, a topological representation of one indoor location may be similar to a topological representation of another indoor location. This may occur, just to describe one example, if more than one area of a floor of a building comprises a particular arrangement of doors or other features. Thus, such a topological representation, herein called an "ambiguous topological representation", may correspond to more than one area. To resolve an uncertainty as to which of a plurality of candidate position fixes is the most accurate (e.g., correct), various positioning techniques involving wireless signals or measurements or other information may be used. For example, in a particular implementation, a method of resolving an uncertainty as to which of a plurality of candidate position fixes is the most accurate may utilize wireless signals received from one or more AP transmitters. For example, an MS may obtain a MAC ID address from signals acquired from one or more access points and obtain range measurements to the access points by measuring one or more characteristics of signals acquired from such access points. Such characteristics of signals may include, for example, received signal strength (RSSI) or round trip time (RTT), as explained in detail below. The MS may then obtain an indoor position fix by applying characteristics of acquired signals to a radio heatmap indicating expected RSSI or RTT values at particular locations in an indoor area. In some embodiments, merely detecting the MAC ID of an AP may allow the MS to distinguish between two or more candidate positions, for example when signals from the AP with which the MAC ID is associated are unlikely to be observable from more than one of the candidate positions. Because such an indoor position fix may be used to resolve an uncertainty as to which of a plurality of candidate position fixes is the most accurate, the position fix need not be precise in some embodiments. For example, wireless transmission signals of merely one AP may allow for an at least approximate position fix that is sufficient to determine which of a plurality of candidate position fixes (as determined using topological representations of areas) is correct. Similarly, highly attenuated (e.g., weakened by traveling through walls) wireless transmission signals of APs or GPS satellites may allow for an at least approximate position fix that is sufficient to determine which of a plurality of candidate position fixes is correct. Of course, such details of techniques to resolve an uncertainty as to which of a plurality of candidate position fixes is the most accurate are merely examples, and claimed subject matter is not so limited.

In certain implementations, as shown in FIG. 1, an MS 100 may receive or acquire SPS signals 159 from SPS satellites 160. In some implementations, SPS satellites 160 may be from one global navigation satellite system (GNSS), such as the GPS or Galileo satellite systems. In other implementations, the SPS Satellites may be from multiple GNSS such as, but not limited to, GPS, Galileo, Glonass, or Beidou (Compass) satellite systems. In other implementations, SPS satellites may be from any one several regional navigation satellite systems (RNSS') such as, for example, WAAS, EGNOS, QZSS, just to name a few examples.

In addition, the MS 100 may transmit radio signals to, and receive radio signals from, a wireless communication network. In one example, MS 100 may communicate with a cellular communication network by transmitting wireless signals to, or receiving wireless signals from, a base station transceiver 110 over a wireless communication link 123. Similarly, MS 100 may transmit wireless signals to, or receiving wireless signals from a local transceiver 115 over a wireless communication link 125.

In a particular implementation, local transceiver 115 may be configured to communicate with MS 100 at a shorter range over wireless communication link 123 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course, it should be understood that these are merely examples of networks that may communicate with an MS over a wireless link, and claimed subject matter is not limited in this respect.

In a particular implementation, base station transceiver 110 and local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between MS 100 and servers 140, 150 or 155 through local transceiver 115 or base station transceiver 110. In another implementation, network 130 may comprise a cellular communication network infrastructure such as, for example, a base station controller or master switching center to facilitate mobile cellular communication with MS 100. In yet another implementation, network 130 may comprise a location server and/or map directory, which may, for example, provide an address or URL of one or more servers or other computer devices—the servers or other computing devices may comprise a location or map or indoor positioning assistance server and/or a map inference server in some embodiments—from which a device may retrieve a map near to or associated with an approximate location; an indoor positioning assistance server, which may, for example, provide assistance data and/or maps and/or position models such as WiFi and/or RSSI models and/or positions of associated devices such as APs; a crowd-sourcing server, which may, for example, collect data to adjust the information provided by the location or map or indoor positioning assistance server and/or map inference server; and/or a PoI server, which may, for example, provide an LBS, just to name a few examples, which may be capable of facilitating communication between MS 100 and servers 140, 150 or 155 through local transceiver 115 or base station transceiver 110. In some embodiments, the location server and/or map directory, indoor positioning assistance server, crowd-sourcing server, and/or PoI server may be integrated with and/or implemented in one or more of the servers 140, 150, and 155.

In particular implementations, and as discussed below, MS 100 may have circuitry and processing resources capable of computing a position fix or estimated location of MS 100. For example, MS 100 may compute a position fix based, at least in part, on pseudorange measurements to four or more SPS satellites 160. Here, MS 100 may compute such pseudorange measurements based, at least in part, on pseudonoise code phase detections in signals 159 acquired from four or more SPS satellites 160. In particular implementations, MS 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, MS 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from MS 100 may be measured to three or more of such terrestrial transmitters fixed at known locations based, at least in part, on pilot signals transmitted by the transmitters fixed at known locations and received at MS 100. Here, servers 140, 150 or 155 may be capable of providing positioning assistance data to MS 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, MS 100 may not be capable of acquiring signals 159 from a sufficient number of SPS satellites 160 or of performing AFLT or OTDOA to compute a position fix. Alternatively, MS 100 may be capable of computing a position fix based, at least in part, on signals acquired from local transmitters (e.g., femto cells or WLAN access points positioned at known locations), such as local transceiver 115, which may comprise an access point. For example, MSs may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, RSSI or RTT. In alternative implementations, MS 100 may obtain an indoor position fix by applying characteristics of acquired signals to a radio heatmap indicating expected RSSI or RTT values at particular locations in an indoor area. As mentioned above, such positioning techniques using wireless signals may be used to resolve an uncertainty as to which of a plurality of candidate position fixes as determined using topological representations of areas is the most accurate.

In particular implementations, MS 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, locations and identities of transmitters, routeability graphs, just to name a few examples. Other assistance data received by the MS may include, for example, local maps of indoor areas for display or to aid in navigation. Such a map may be provided to MS 100 as MS 100 enters a particular indoor area. Such a map may show indoor features such as doors, hallways, entry ways, walls, etc., points of interest such as bathrooms, pay phones, room names, stores, etc. By obtaining and displaying such a map, an MS may overlay a current location of the MS (and user) over the displayed map.

In one implementation, a routeability graph and/or digital map may assist MS 100 in defining feasible areas for navigation within an indoor area and subject to physical obstructions (e.g., walls) and passage ways (e.g., doorways in walls). Here, by defining feasible areas for navigation, MS 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular implementation, MS 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of MS 100.

According to an implementation, MS 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, if memory resources at MS 100 and data transmission resources make receipt of indoor navigation assistance data for all areas served by servers 140, 150 or 155 impractical or infeasible, a request for indoor navigation assistance data from MS 100 may indicate a rough or course estimate of a location of MS 100. MS 100 may then be provided indoor navigation assistance data covering areas including and/or proximate to the rough or course estimate of the location of MS 100.

In one particular implementation, a request for indoor navigation assistance data from MS 100 may specify a location context identifier (LCI). Such an LCI may be associated with a locally defined area such as, for example, a particular floor of a building or other indoor area which is not mapped according to a global coordinate system. In one example scenario, a building may represent a localized environment and each floor of the building may represent a different location context having a corresponding LCI. In some other scenarios, large floors of a building may be divided into multiple location contexts (e.g., terminals of an airport, etc.). Many other arrangements for defining location contexts may alternatively be used and may, for example, depend upon the specific geometry and/or complexity of the corresponding environment. A localized positioning solution may also include one or more directory servers that may be accessed by mobile devices to obtain information about a localized environment. LCIs may uniquely identify location contexts such as areas within a region. In one example server architecture, upon entry of an area, MS 100 may request a first server, such as server 140, to provide one or more LCIs covering the area or adjacent areas. Here, the request from the MS 100 may include a rough location of MS 100 such that the requested server may associate the rough location with areas covered by known LCIs, and then transmit those LCIs to MS 100. MS 100 may then use the received LCIs in subsequent messages with a different server, such as server 150, for obtaining navigation assistance relevant to an area identifiable by one or more of the LCIs as discussed above (e.g., digital maps, locations and identifies of beacon transmitters, radio heatmaps or routeability graphs).

Figure 2:
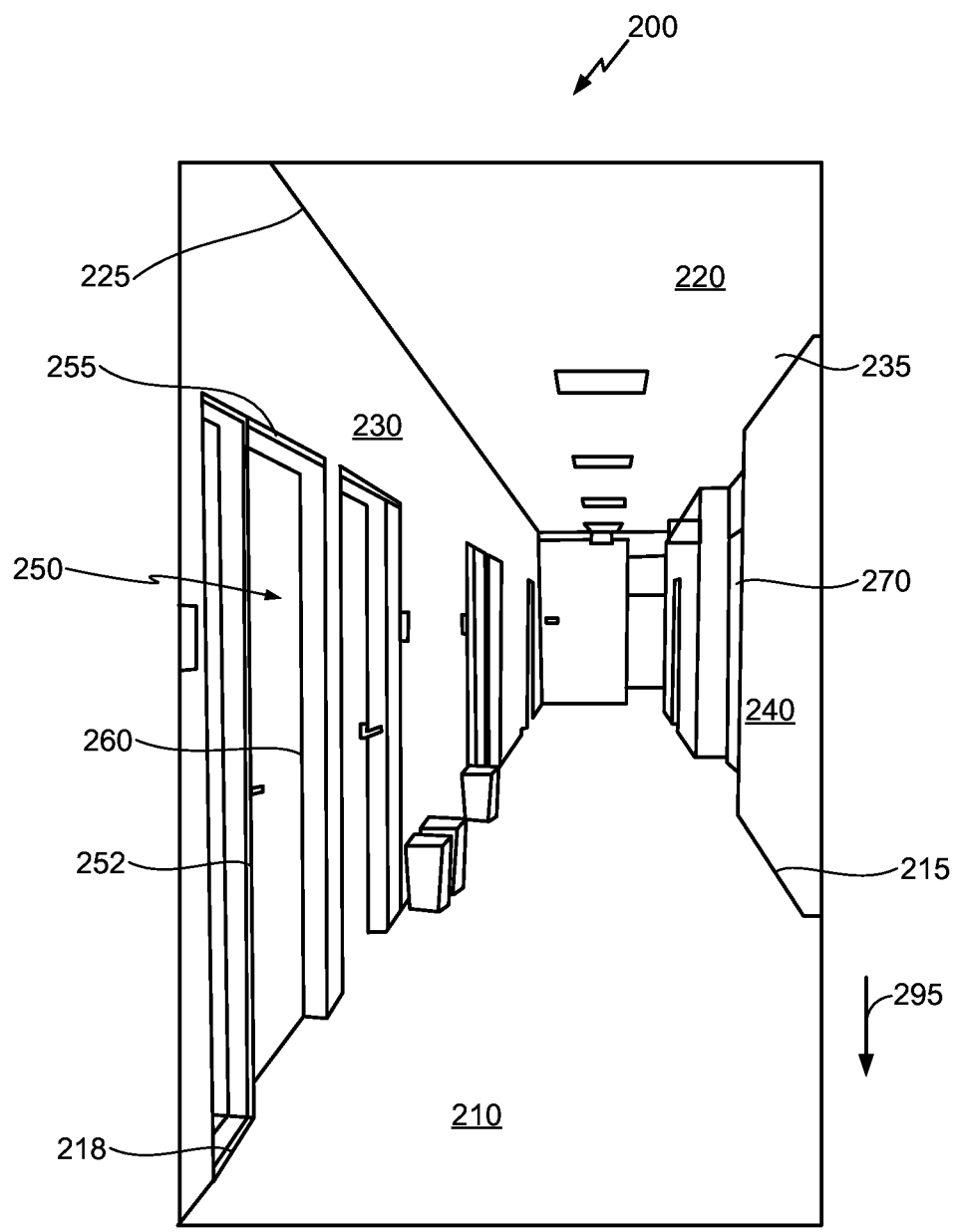
FIG. 2 is an image of a hallway in a building, according to an implementation.

FIG. 2 is an image 200 of a hallway in a building, according to an implementation. For example, such an image may be captured by a camera included in an MS. In a particular implementation, however, such an image may be captured by any camera, which need not be included in an MS. Image 200 may include a two-dimensional representation of a number of three-dimensional features such as doors, doorways, stairs, a ceiling, a floor, lights, tiles, and so on. For example, a few of such features, among others, have been labeled in FIG. 2. In particular, image 200 includes door 250, doorway 270, ceiling 220, right wall 240, left wall 230, and floor 210. Other features include a left door edge 252, a right door edge 260, a top door edge 255, a left floor-wall intersection 218, a right floor-wall intersection 215, a left ceiling-wall intersection 225, and a right ceiling-wall intersection 235, just to name a few examples.

As used to describe such implementations herein, terms "above", "below", "upper", "lower", "horizontal", "vertical", "right", "left", "side", and so on describe positions or orientations relative to a particular direction in an image. For example, such a particular direction in an image may correspond to a direction of gravitational attraction that would act on an object in the area shown in the image. Of course, it is understood that such terms need not refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

In a particular implementation, an image such as 200 may comprise a digital image that is annotated (e.g., with metadata, for example) to include information regarding an orientation, herein called a "rotation vector", of the image with respect to a direction defined by gravity. Including a rotation vector, depicted by label 295 in FIG. 2, for example, may provide a benefit in a case where an image is captured by a camera that is rotated out of plumb with respect to gravity. Features in an image may be properly identified based, at least in part, on such a rotation vector. For example, a rotation vector may be used to determine which surface in an image is a floor versus a ceiling of a hallway. Such a distinction may be useful for processes, as described herein, that determine a location of an MS based, at least in part, on number or relative positions of features of an area captured by an image, for example. A rotation vector of an image may be determined based, at least in part, on any of a number of sensors that may be located with a camera (e.g., of an MS) that captured the image. For example, such sensors may comprise a gravitometer or inertial sensors. Of course, details of image 200 are merely examples, and claimed subject matter is not so limited.

Figure 3:
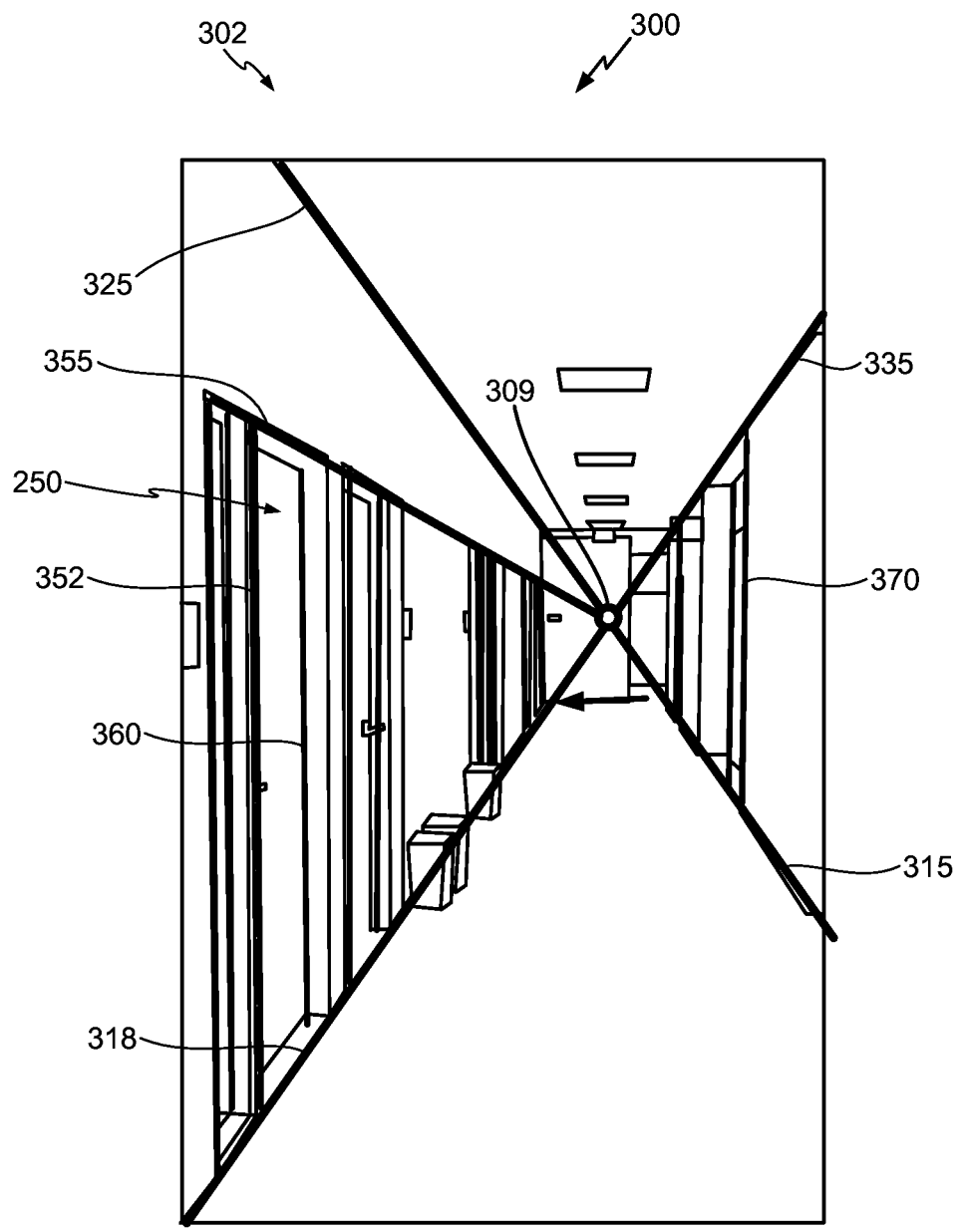
FIG. 3 is an image of a hallway, the image including highlighted linear features, according to an implementation.

FIG. 3 is an image 300 of a hallway 302, according to an implementation. Such an image may comprise image 200 including highlighted two-dimensional representations of three-dimensional linear features in the image. Here, highlighted linear features may comprise features in an image that are identified as having an at least approximate linear characteristic. For example, a feature in an image may comprise a door having a linear edge (e.g., top or side edges). As another example, a feature in an image may comprise a line of intersection between a floor and a wall. Highlighting may be performed on an image (e.g., a digital image) by a processor, for example, to digitally identify linear features. It will be appreciated, however, that an image 300 may not be created in some embodiments. Rather, one or more characteristics of image 300 may be determined or calculated based on the image 200 without actually performing any highlighting or modifying the image 200. Thus, the image 300 may be understood to be illustrative of certain concepts discussed herein, but may not be constructed in some embodiments.

As mentioned above, an image of an area may include a number of features including doors, doorways, stairs, hall lights, wall corners, floor or ceiling tiles, and so on. Any number of such features in an area may be arranged in a substantially linear fashion. For example, top edges of doors in a hallway may be arranged in a line. In another example, an intersection where a floor meets a wall may form a line. Similarly, an intersection where a ceiling meets a wall may form a line. For example, image 300 includes a highlighted edge 370 of doorway 270, highlighted left door edge 352, highlighted right door edge 360, highlighted top door edge 355, highlighted left floor-wall line of intersection 318, highlighted right floor-wall line of intersection 315, highlighted left ceiling-wall line of intersection 325, and highlighted right ceiling-wall line of intersection 335, just to name a few examples. Such highlighted linear features may be used to generate a topological representation of hallway 302 that may be used to obtain a position fix of an MS.

A topological representation of hallway 302 shown in image 300 may comprise information, data, and/or digital electronic signals representing a particular geometrical arrangement of points, features, lines, line segments, and/or symbols based, at least in part, on relative positions of highlighted doorway edge 370, highlighted door edges 352, 355, 360, highlighted floor-wall lines of intersections 315, 318, and/or highlighted ceiling-wall lines of intersections 325 and 335, for example. Other highlighted linear features, though shown in image 300, are not discussed to simplify this discussion. However, a topological representation of hallway 302 shown in image 300 may be based, at least in part, on relative positions of doors or doorways visible in the image in addition to that of door 250, for example.

Because a number or arrangement of highlighted linear features shown in an image of an area may be unique to that area, a topological representation of the area may act as a "fingerprint" to identify the area. For example, upon or after capturing image 300 of hallway 302, an MS may determine and/or generate a topological representation of the hallway. The MS may then compare features of the topological representation of hallway 302 to one or more topological representations of multiple areas covered by a digital map that includes the hallway. Determining a match between the topological representation of the hallway and a topological representation of an area in the digital map may allow the MS to estimate a location of the hallway.

In an implementation, a topological representation of an area, such as a hallway, for example, may be generated in view of a number of aspects of linear features of an image of the area. For example, one aspect is that a two-dimensional representation of linear features in an image of a three-dimensional portion of an indoor area may converge at a vanishing point 309. In the case shown in FIG. 3, four or more linear features may converge to vanishing point 309 in image 300. In particular, highlighted door edge 355, floor-wall lines of intersections 315, 318, and ceiling-wall lines of intersections 325 and 335, converge to vanishing point 309. As explained below, a topological representation of an area may be generated based, at least in part, on vanishing point 309, which may be used to define a right side and a left side of an area shown in an image. Another aspect of linear features of an image of an area, such as a hallway, for example, is that edges (e.g., sides) of doors in the image may comprise substantially parallel lines having endpoints between linear features that converge to a vanishing point. Assuming that an individual door comprises two parallel edges, this aspect of door edges may provide a way for a processor, for example, to detect a number of doors or their relative locations in an image. In addition, vanishing point 309 may provide a way for a processor to determine a number of doors on a right side and a left side of an area shown in an image. In some embodiments, door edges may be identified as being substantially perpendicular to lines that converge on a vanishing point. Similarly, lines that may converge on a vanishing point may be identified as being substantially perpendicular to substantially parallel lines. In other embodiments, sides of a door may converge to a vanishing point, such as in a case where the doors are not perpendicular to a field of view, for example. If lines or other linear features in an image converge to a plurality of vanishing points such as, for example, if floor-wall lines converge to a first vanishing point and door sides converge to a second vanishing point, the vanishing points may be distinguished from each other based, at least in part, on which appears in the image and which is outside the image, for example. In some embodiments, a vanishing point which appears to be located within an image may be selected, and a topological representation may be determined with respect to the selected vanishing point. In some embodiments, vanishing points which appear to be located outside of the image may be ignored in determining a topological representation. Of course, details of techniques for generating a topological representation of an area shown in image 300 are merely examples, and claimed subject matter is not so limited.

Figure 4:
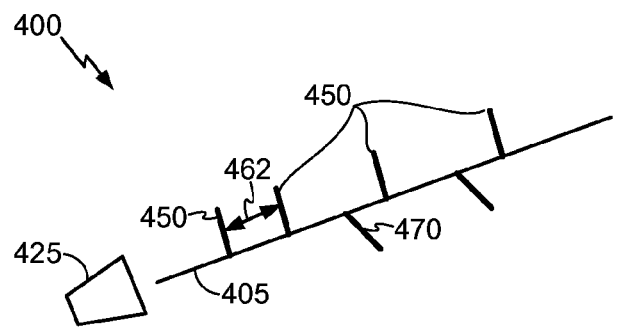
FIG. 4 is a topological representation of an indoor portion of a building, according to an implementation.

FIG. 4 is a topological representation 400 of an indoor portion of a building, according to an implementation. For example, a topological representation of an area may comprise information, data, and/or digital electronic signals representing a particular geometrical arrangement of points, features, lines, line segments, and/or symbols corresponding to three-dimensional features of the area. Accordingly, a topological representation of an area may be based, at least in part, on a number or arrangement of features in an area. Because a number or arrangement of features may be unique to a particular area, a topological representation of the area may act as a "fingerprint" to identify the area. For example, upon or after capturing an image of a particular area, an MS may generate a topological representation of the particular area. It will be appreciated that the MS may not actually construct and/or store the representation 400 shown in FIG. 4 in some embodiments. Rather, the MS may determine the topological representation 400 and/or features or characteristics thereof without generating a file or image that resembles the illustration in FIG. 4. Thus, the implementation shown in FIG. 4 may be understood to be illustrative of certain concepts discussed herein, but may not be constructed as shown in some embodiments by the MS or other computing device.

In the particular example shown in FIG. 3, hallway 302 may have four doors on the left (in a captured image of the hallway) and two doors on the right. Accordingly, a topological representation of hallway 302 may comprise a line 405 representative of the floor of the hallway, line segments 450 representative of four doors on the left, and line segments 470 representative of two doors on the right. A distance 462 between line segments 450 or 470, or other symbols representative of doors, may correspond to a relative distance between doors shown in an image. A processor, for example, may determine such a relative distance from distances among highlighted linear features in an image. In an example implementation, a processor may count pixels between or among highlighted linear features in a digital image to determine relative distances between or among the features, though claimed subject matter is not so limited. Also, distances between doors may be determined based, at least in part, on heights of the doors, which may be proportional to a distance from a camera, for example. For illustrative purposes, symbol 425 may represent a relative location, with respect to features of image 300, of a camera that captured the image of hallway 302. Of course, such details of topological representation 400 are merely examples, and claimed subject matter is not so limited.

Figure 5:
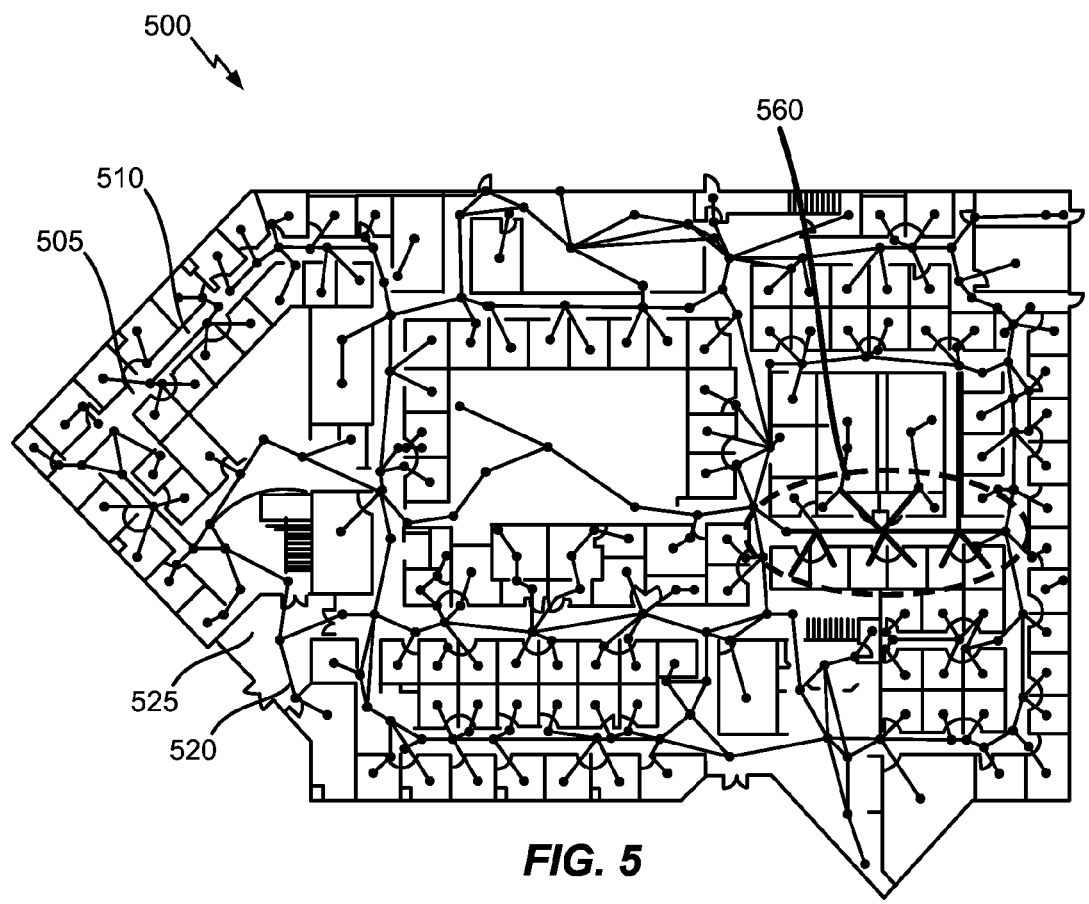
FIG. 5 is a map of a floor of a building including topological representations of hallways, corridors, or rooms, according to an implementation.

FIG. 5 is a digital map 500 of a floor 590 of a building including topological representations of hallways, corridors, or rooms, according to an implementation. For example, map 500 may comprise data representing indoor structures (e.g., walls, halls, doors, rooms, and so on) associated with topological representations of such structures. In an implementation, indoor structures and topological representations of such structures covered by map 500 may be extracted from data using code executed by a processor (e.g., general-purpose processor(s) 911 or processing unit 1020 shown in FIGS. 9 and 10, respectively). In such a fashion, a digital map may be obtained or retrieved from a memory of a land-based computing platform or an MS. Map 500 may comprise a vector graphics file format used to store digital images in a memory. For example, map 500 may comprise a collection of bits in any of a number of image file formats, such as a Joint Photographic Experts Group (JPEG) format, Tagged Image File Format (TIFF), or Graphics Interchange Format (GIF), just to name a few examples. In some embodiments, a topological representation or map may be derived from a floor plan or other electronic map, or may be derived based, at least in part, on a routeability graph, by an MS or a server, for example. In other embodiments, a topological representation or map may be pre-stored in an MS for later use, or received as part of other communications or data, for example as part of assistance data or other data or communications.

As discussed above, an MS may compare a topological representation of a particular area captured in an image to a number of stored topological representations of multiple areas covered by a digital map that includes the particular area. Determining a match between the topological representation of the particular area and a stored topological representation of an area in the digital map may allow the MS to determine a position of the particular area. Accordingly, the MS, having captured the image while located in the particular area, may determine its position. Map 500 comprises a plurality of topological representations of various areas of a floor of a building. For example, among others, map 500 includes topological representation 510 of hallway 505 and topological representation 520 of room 525. In a particular example, a hallway represented by a topological representation in area 560 may match a topological representation, such as 400, for example, generated from a captured image. Of course, such details of map 500 are merely examples, and claimed subject matter is not so limited.

A process of searching for a match among a topological representation of a captured image and a plurality of topological representations in a digital map may include determining whether or which features or characteristics of the topological representation of the captured image are similar to features or characteristics of topological representations in the digital map. For example, two topological representations containing similar or at least approximately similar numbers or relative positions of doors on respective sides of a walkway may be considered to be matching.

Figure 6:
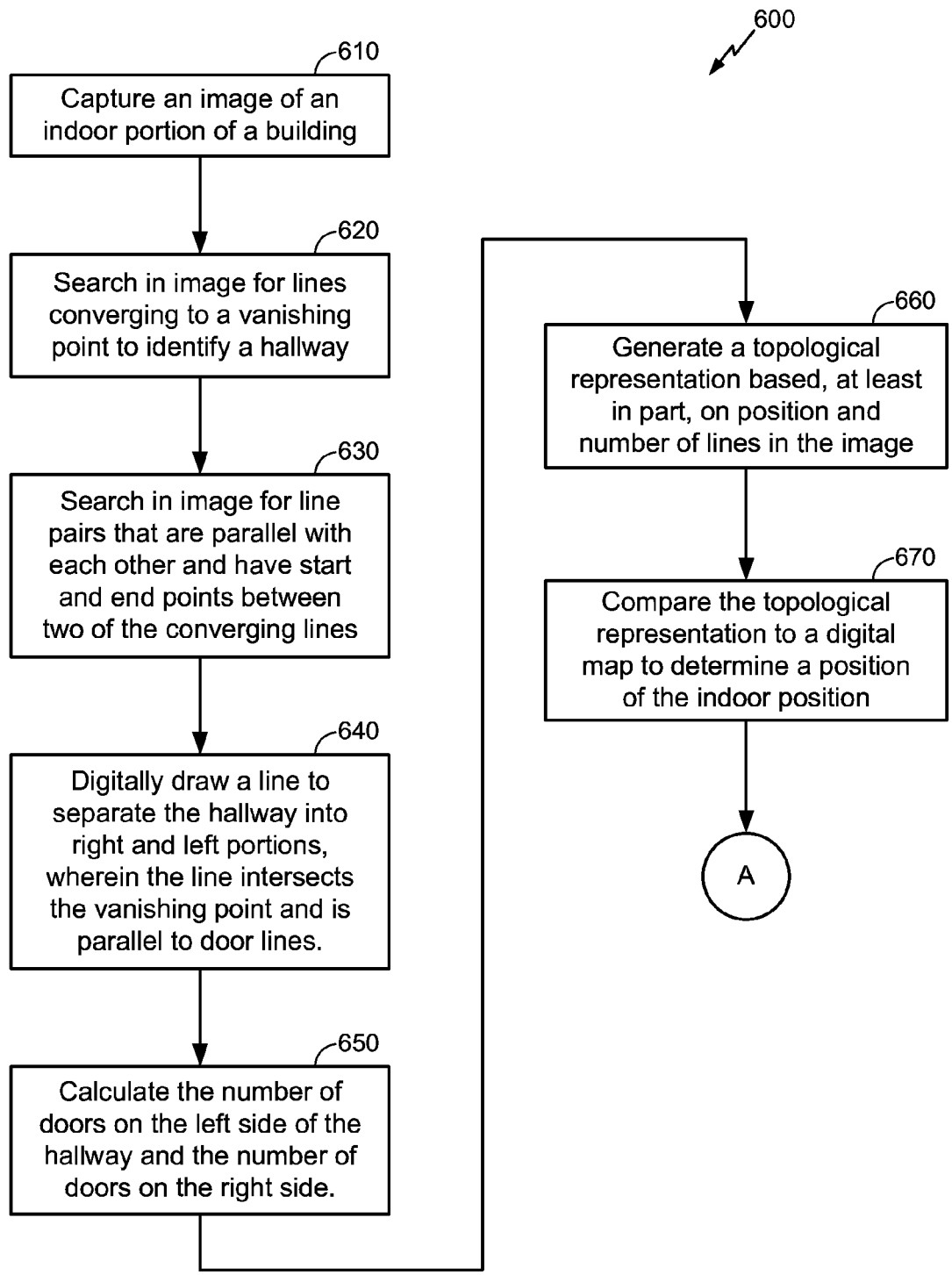
FIG. 6 is a flow diagram illustrating a process for determining a position of a mobile station in a building, according to an implementation.

FIG. 6 is a flow diagram illustrating a process 600 for determining a position of a mobile station in a building, according to an implementation. Process 600 may be performed as a first fix, or anytime thereafter. For example, positioning may drift if corridors are encountered, and a particle cloud may split among multiple paths. Positioning accuracy may also be compromised if WiFi information is inadequate. In such cases of lost positioning accuracy, a visual image may be used to snap a candidate position back to an accurate spot, for example. Process 600, may be performed by an MS, such as MS 100 shown in FIG. 1, for example. In another example, however, at least some portions of process 600 may be performed by a land-based processor, though claimed subject matter is not so limited. Moreover, process 600 may be performed to determine a location in a building of an area captured in an image. In such a case, process 600 may be performed at any time after (e.g., minutes, hours, days, weeks, or years) an image of an area is captured. In other embodiments, process 600 may be performed substantially in real time to determine a current or recent position of the MS 100.

Process 600 may include determining a topological representation of an area captured in an image. At block 610, an image of an indoor portion of a building may be captured by a camera, which may be onboard an MS. In one implementation, however, a camera need not be included in an MS. Such an indoor portion may comprise a hallway, a corridor, a room, and so on. Moreover, such an indoor portion may include a number of features including doors, doorways, stairs, hall lights, wall corners, floor or ceiling tiles, stairs, cubicles, relatively large furniture items, wall paintings, and so on. As mentioned above, any number of such features in an area may be arranged in a substantially linear fashion. For example, top edges of doors in a hallway may be arranged in a line. In another example, an intersection where a floor meets a wall may form a line. Similarly, an intersection where a ceiling meets a wall may form a line. In yet another example, right or left edges of lights in a ceiling of a corridor may be arranged in a line. At block 620, a processor (which may be onboard an MS or may comprise a land-based processor, for example) may search the captured image to identify linear features or lines that converge to a vanishing point within the image, which may indicate that the captured image shows a hallway, corridor, or other indoor space, for example. Such a search may involve a line detection process, where features in an image may be identified as candidate lines, for example. A few lines, one or more line pairs, or a random sample of lines may be used to attempt to find one or more vanishing points. At block 630, the processor may perform a search of the image to detect parallel (or approximately parallel) line pairs that have start and end points between the converging lines identified at block 620. Such a parallel line pair may correspond to side edges of a door. A line pair need not be precisely parallel, but may also be substantially or approximately parallel, wherein the lines may be out of parallel by up to a few degrees, for example. In some embodiments, line pairs that converge at a second vanishing point in or out of the image may be identified at block 630, for example. At block 640, the processor may identify right and left sides of the space (e.g., a hallway) captured in the image. For example, a line parallel to line pairs detected at block 630 and intersecting the vanishing point detected at block 620 may comprise a line of separation between a right side and the left side of the area captured in the image. A second vanishing point may also be used in this way to detect a line of separation between a right side and the left side of an area. At block 650, the number of doors in the right side and the left side of the area may be determined based, at least in part, on the number of parallel line pairs detected at block 630. For example, three such lines pairs in the left side may correspond to three doors in the left wall of a hallway. In some embodiments, vanishing points need not be identified, such as in a case, for example, of a curving hallway. Thus, the process described above is merely an example process that may be used, for example, to identify features and/or elements for determining a topological representation of an area. Other techniques and/or functions may be used to determine such features and/or elements and/or such topological representation.

At block 660, a topological representation of an area captured in the image may be based, at least in part, on a number, position, or arrangement of linear features, such as doors, for example, in the area. Because a number or arrangement of linear features may be unique to a particular area, a topological representation of the area may act as a "fingerprint" to identify the area. Accordingly, at block 670, the MS (or land-based processor) may compare the topological representation of the area captured in the image to a number of stored topological representations of multiple areas covered by a digital map that includes the particular area. In one implementation, such comparing may be performed over all possible combinations of topological representations. In another implementation, however, such a process of comparing may be shortened by considering particular LCIs. For example, an MS may compare the topological representation of an area of a particular LCI (e.g., a second floor of a building) captured in an image to a number of stored topological representations of multiple areas of a similar or same LCI (e.g., the second floor). In yet another implementation, such a process of comparing may be based, at least in part, on whether an MS is performing a first position fix or whether a prior position of the MS is known.

Determining a match between the topological representation of the area captured in the image and a stored topological representation of an area in the digital map may allow the MS (or land-based processor) to determine a position of the area captured in the image. For example, two topological representations containing similar numbers or relative positions of doors on respective sides of a walkway may be considered to be matching. In another example, the number of doors on each side of a hallway or approximate positions of doors, distances between doors, and so on may also be considered during a process of matching a topological representation of an area captured in an image and a stored topological representation of an area. In some implementations, such a process of matching may be performed by a processor executing code comprising a search algorithm, for example. In some embodiments, the number of such features or approximate grouping may be considered irrespective of which side of a hallway the features are located on or a relative location of each of the features. During some embodiments, certain features may be distinguished, for example, such as doors versus intersecting hallways, closed doors versus open doorways, doors versus cubicle partitions, doors on one side of a hall versus the other side of the hall, or a total number of doors/features in an area. Thus, some embodiments may treat these elements the same (e.g., as a nondescript feature located on one side of a hallway or another), while other embodiments may identify these as separate types of elements and determine whether a match exists based, at least in part, on the number and positions of the different element types with respect to one another. Accordingly, the MS, having captured an image while located in a particular area, may determine its position. However, in some situations, determining an exact position may not be a goal. Rather, determining approximate area or relative position so that a particle filter may be initialized or primed may be a sufficient goal.

For example, at the beginning of a positioning process (e.g., if lacking adequate AP measurements), particle filter initialization may be a goal instead of determining an exact position. In some implementations, particle filter initialization may comprise considering particles to be uniformly distributed over an entire floor of a building. If embodiments described herein are used to narrow the potential position of a device, for example to one or two possible locations in the building, initial particles may be distributed with high density in these locations. Particles in incorrect positions may quickly die out in some embodiments, allowing fast convergence.

Figure 7:
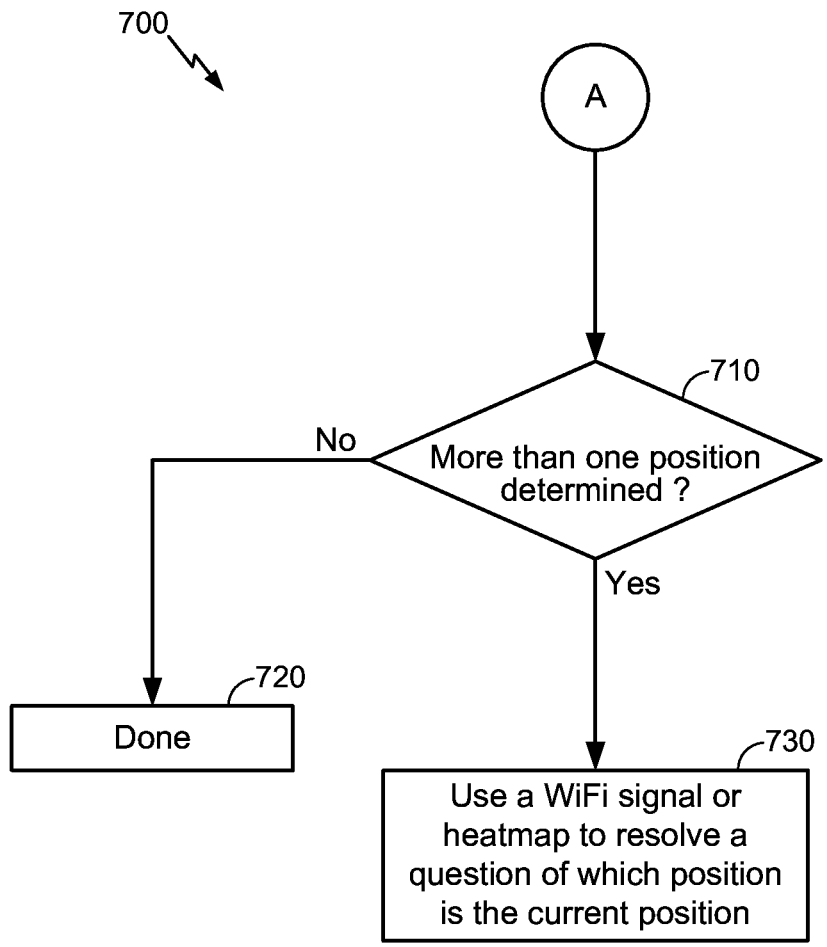
FIG. 7 is a flow diagram illustrating a process for resolving conflicts of more than one possible position of a mobile station in a building, according to an implementation.

In some cases, however, more than one match may be found between the topological representation of the area captured in the image and stored topological representations of areas in the digital map. For example, a topological representation of one indoor position may be similar to a topological representation of another indoor position. This may occur, just to describe one example, if more than one area of a floor of a building comprises a particular arrangement of doors or other features. Thus, such an ambiguous topological representation may correspond to more than one area or to multiple position fixes. To consider such a possibility, process 600 may proceed to diamond 710 in process 700, shown in FIG. 7, for example. If one match is found at block 670, then process 700 may proceed to block 720, where such a match may allow for positioning of the MS, for example. On the other hand, if more than one match is found, process 700 may proceed to block 730 to resolve an uncertainty as to which of a plurality of candidate position fixes is the most accurate. On the other hand, exact matches may not always be found, for example due to obstructions in an image or incorrect line detection, among other reasons. A tolerance or acceptable error may allow for accommodation of inexact matches, for example. In one implementation, individual position determinations may be associated with a probability, likelihood, or confidence value. A match may be returned if such value is above a threshold, though claimed subject matter is not so limited.

In one implementation, disambiguation of candidate position fixes may be based, at least in part, on any sensor that may be included in an MS. For example, such sensors may detect temperature, noise, or light level, just to name a few examples. Also, a compass or magnetometer may be used to determine approximately what direction a camera is pointing while capturing an image. Direction determination may be used to distinguish among similar areas of a building that are arranged along different directions. Further, probability, likelihood, or confidence values mentioned above may be used to select from among a plurality of potential locations, for example.

For example, in a particular implementation, a method of resolving an uncertainty as to which of a plurality of candidate position fixes is the most accurate may utilize wireless signals received from one or more AP transmitters. As mentioned above, an MS may obtain an indoor position fix by applying characteristics of acquired signals to a radio heatmap indicating expected RSSI or RTT values at particular locations in an indoor area. Because such an indoor position fix may be used to resolve an uncertainty as to which of a plurality of candidate position fixes is the most accurate, the position fix need not be precise. For example, wireless transmission signals of merely one AP may allow for an at least approximate position fix that is sufficient to determine which of a plurality of candidate position fixes (as determined using topological representations of areas) is correct. Similarly, highly attenuated (e.g., weakened by traveling through walls) wireless transmission signals of APs or GPS satellites may allow for an at least approximate position fix that is sufficient to determine which of a plurality of candidate position fixes is correct. Further details of access points, RSSI and RTT values, and heatmaps, for example, are discussed below. Of course, such details of processes 600 and 700 are merely examples, and claimed subject matter is not so limited.

Figure 8:
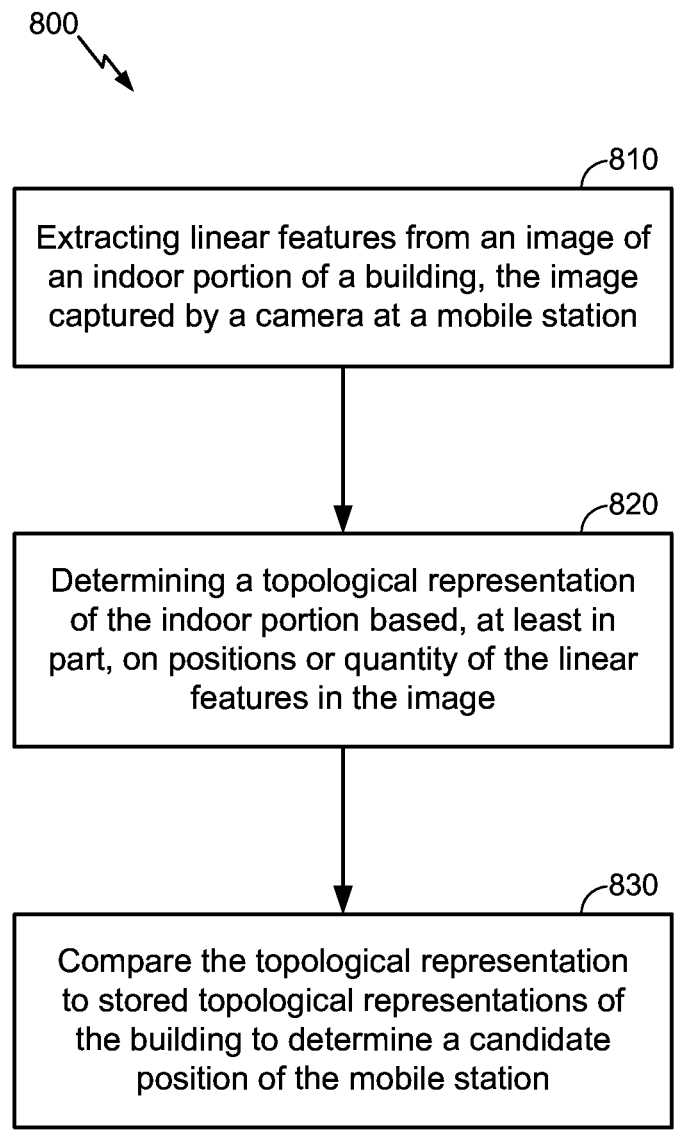
FIG. 8 is a flow diagram illustrating a process for determining a position of a mobile station in a building, according to another implementation.

FIG. 8 is a flow diagram illustrating a process for determining a position of a mobile station in a building, according to another implementation. Process 800 may be implemented in one or more land-based computing platforms or an MS, for example. At block 810, an image of an indoor portion of a building may be captured, such as by a camera onboard an MS, for example. Further, linear features from the image may be extracted. At block 820, a topological representation of the indoor portion of the building may be generated based, at least in part, on positions or number of lines in the image, as discussed above, for example. At block 830, the topological representation may be compared to stored topological representations in a digital map of the building to determine a position of the indoor portion of the building.

Process 800 may provide a number of advantages for cases where there are inadequate signals. But even during cases where there are adequate signals, process 800 may comprise a relatively quick and/or accurate technique for narrowing a list of potential locations, or for correcting an estimated or errant position. In some embodiments, process 800 may reduce a time to first fix. For example, process 800 may involve line detection, which may be fast and/or consume few processing resources. Thus, process 800 may comprise a relatively fast and power-efficient way to determine approximate position. Further, process 800 may be performed without identifying feature points and/or searching a database to identify known objects in an image in order to determine a potential location of a device based, at least in part, on known locations of the features points or objects in some embodiments. Of course, such details and advantages of process 800 are merely examples, and claimed subject matter is not so limited.

Figure 9:
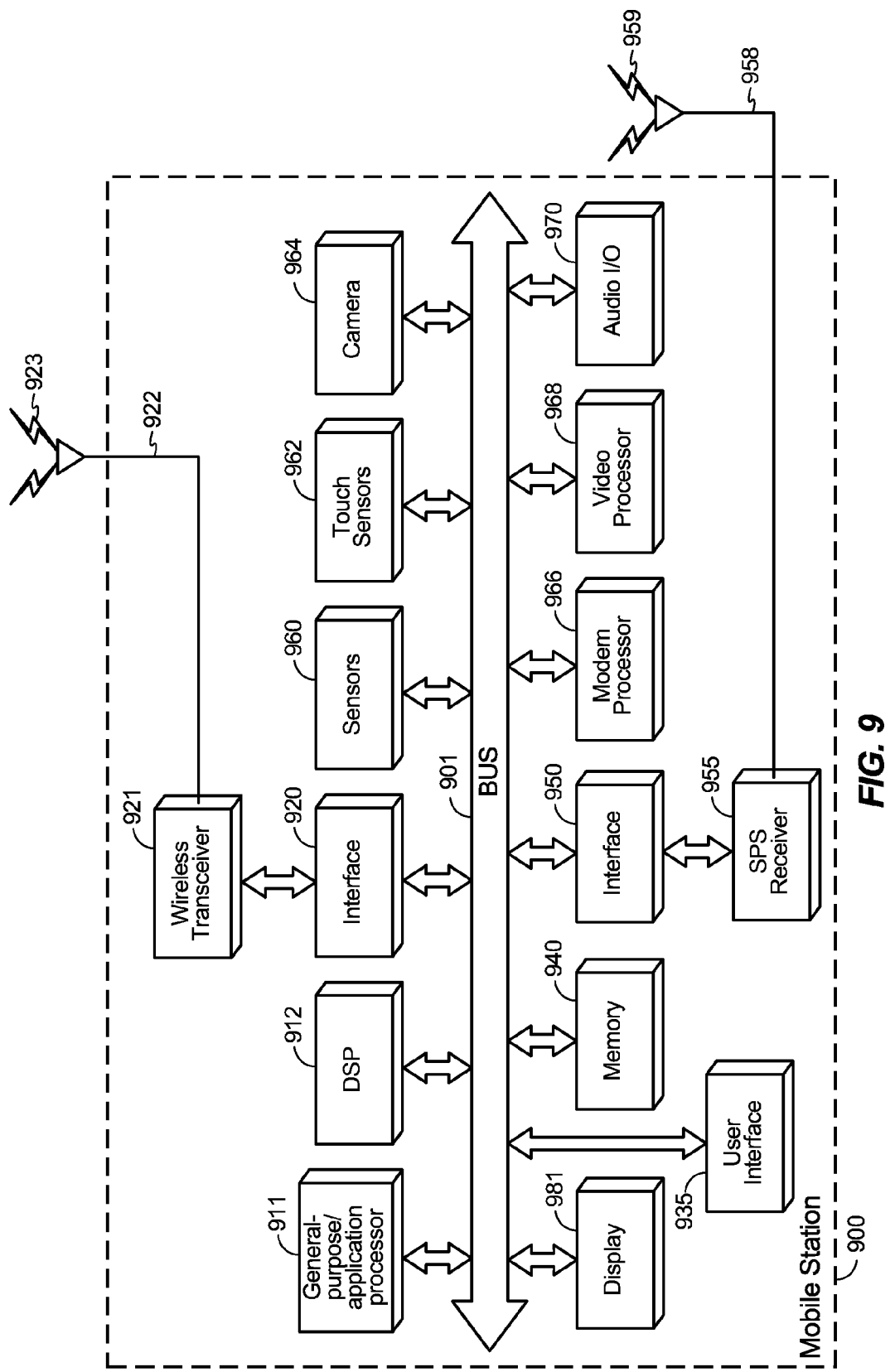
FIG. 9 is a schematic block diagram illustrating an exemplary mobile station, in accordance with an implementation.

FIG. 9 is a schematic block diagram of an MS 900, according to an implementation. MS 900 may comprise one or more features of MS 100 shown in FIG. 1, for example.

In certain implementations, MS 900 may also comprise a wireless transceiver 921 which is capable of transmitting and receiving wireless signals 923 via an antenna 922 over a wireless communication network, such as over a wireless communication link 123, shown in FIG. 1, for example. Wireless transceiver 921 may be connected to bus 901 by a wireless transceiver bus interface 920. Wireless transceiver bus interface 920 may, in some implementations be at least partially integrated with wireless transceiver 921. Some implementations may include multiple wireless transceivers 921 and wireless antennas 922 to enable transmitting and/or receiving signals according to a corresponding multiple wireless communication standards such as, for example, WiFi, CDMA, WCDMA, LTE and Bluetooth, just to name a few examples.

MS 900 may also comprise SPS receiver 955 capable of receiving and acquiring SPS signals 959 via SPS antenna 958. SPS receiver 955 may also process, in whole or in part, acquired SPS signals 959 for estimating a location of MS 1000. In some implementations, general-purpose processor(s) 911, memory 940, DSP(s) 912 and/or specialized processors (not shown) may also be utilized to process acquired SPS signals, in whole or in part, and/or calculate an estimated location of MS 900, in conjunction with SPS receiver 955. Storage of SPS or other signals for use in performing positioning operations may be performed in memory 940 or registers (not shown).

Also shown in FIG. 9, MS 900 may comprise digital signal processor(s) (DSP(s)) 912 connected to the bus 901 by a bus interface 910, general-purpose processor(s) 911 connected to the bus 901 by a bus interface 910 and memory 940. Bus interface 910 may be integrated with the DSP(s) 912, general-purpose processor(s) 911 and memory 940. In various implementations, functions or processes, such as processes 600, 700, and/or 800 shown in FIGS. 6, 7, and/or 8, for example, may be performed in response to execution of one or more machine-readable instructions stored in memory 940 such as on a computer-readable storage medium, such as RAM, ROM, FLASH, or disc drive, just to name a few example. The one or more instructions may be executable by general-purpose processor(s) 911, specialized processors, or DSP(s) 912. In one implementation, for example, one or more machine-readable instructions stored in memory 940 may be executable by a processor(s) 911 to: extract linear features from an image of an indoor portion of a building (e.g., block 810, FIG. 8), the image captured by a camera at a mobile station; determine a topological representation of the indoor portion based, at least in part, on positions or quantity of the linear features in the image, (e.g., block 820, FIG. 8); and compare the topological representation to stored topological representations of the building to determine a candidate position of the mobile station (e.g., block 830, FIG. 8). In some embodiments, stored topological representations may comprise distinct representations, for example, individually representing different areas or floors of a building. In some embodiments, the stored topological representations may comprise portions of a larger representation. For example, comparing the determined topological representation to stored topological representations may comprise comparing the determined topological representation to portions of a topological representation of a floor of a building to determine a candidate position(s) on that floor. Memory 940 may comprise a non-transitory processor-readable memory and/or a computer-readable memory that stores software code (programming code, instructions, etc.) that are executable by processor(s) 911 and/or DSP(s) 912 to perform functions described herein such as, but not limited to, processes 600, 700, and/or 800, for example. In some embodiments, the processor(s) 911 and/or DSP(s) 912 perform, in combination with the memory 940, one or more of blocks 610-670, 710-730, and/or 810-830.

Also shown in FIG. 9, a user interface 935 may comprise any one of several devices such as, for example, a speaker, microphone, display device, vibration device, keyboard, touch screen, just to name a few examples. In a particular implementation, user interface 935 may enable a user to interact with one or more applications hosted on MS 900. For example, devices of user interface 935 may store analog or digital signals on memory 940 to be further processed by DSP(s) 912 or general purpose processor 911 in response to action from a user. Similarly, applications hosted on MS 900 may store analog or digital signals on memory 940 to present an output signal to a user. In another implementation, MS 900 may optionally include a dedicated audio input/output (I/O) device 970 comprising, for example, a dedicated speaker, microphone, digital to analog circuitry, analog to digital circuitry, amplifiers and/or gain control. It should be understood, however, that this is merely an example of how an audio I/O may be implemented in an MS, and that claimed subject matter is not limited in this respect. In another implementation, MS 900 may comprise touch sensors 962 responsive to touching or pressure on a keyboard or touch screen device.

MS 900 may also comprise a dedicated camera device 964 for capturing still or moving imagery. Camera device 964 may be used, for example, to capture an image of an indoor portion of a building that may subsequently be provided to one or more processing units to: extract linear features from the image (e.g., at block 810, FIG. 8); determine a topological representation of the indoor portion based, at least in part, on positions or quantity of the linear features in the image (e.g., at block 820, FIG. 8); and compare the topological representation to stored topological representations of the building to determine a candidate position of the mobile station (e.g., at block 830, FIG. 8). Camera device 964 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose processor 911 or DSP(s) 912. Alternatively, a dedicated video processor 968 may perform conditioning, encoding, compression or manipulation of signals representing captured images. Additionally, video processor 968 may decode/decompress stored image data for presentation on a display device 981 on MS 900.

MS 900 may also comprise sensors 960 coupled to bus 901 which may include, for example, inertial sensors and environment sensors that may be used for ground-truth measurements, as described above. Inertial sensors of sensors 960 may comprise, for example accelerometers (e.g., collectively responding to acceleration of MS 900 in three dimensions), one or more gyroscopes or one or more magnetometers (e.g., to support one or more compass applications). Environment sensors of MS 900 may comprise, for example, temperature sensors, barometric pressure sensors, ambient light sensors, camera imagers, and microphones, just to name few examples. Sensors 960 may generate analog or digital signals that may be stored in memory 940 and processed by DPS(s) or general purpose processor 911 in support of one or more applications such as, for example, applications directed to positioning or navigation operations.

As discussed above, sensors 960 may be used for disambiguation of candidate position fixes, for example to determine which direction a mobile device is facing or to disambiguate between a plurality of candidate positions, though claimed subject matter is not so limited.

In a particular implementation, MS 900 may comprise a dedicated modem processor 966 capable of performing baseband processing of signals received and downconverted at wireless transceiver 921 or SPS receiver 955. Similarly, modem processor 966 may perform baseband processing of signals to be upconverted for transmission by wireless transceiver 921. In alternative implementations, instead of having a dedicated modem processor, baseband processing may be performed by a general purpose processor or DSP (e.g., general purpose processor 911 or DSP(s) 912). It should be understood, however, that these are merely examples of structures that may perform baseband processing, and that claimed subject matter is not limited in this respect.

Figure 10:
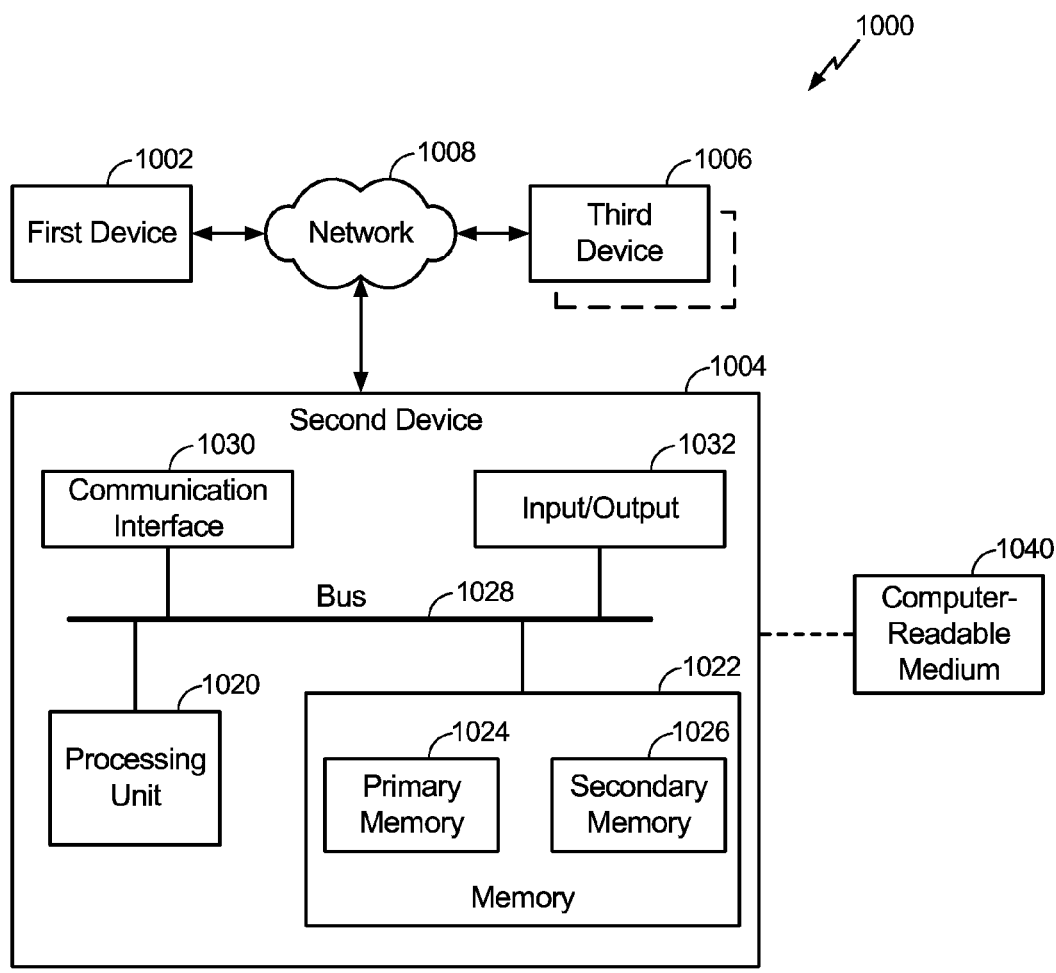
FIG. 10 is a schematic block diagram of an example computing platform.

FIG. 10 is a schematic block diagram illustrating an example system 1000 that may include one or more devices configurable to implement techniques or processes, such as processes 600, 700, and/or 800 described above, for example. System 1000 may include, for example, a first device 1002, a second device 1004, and a third device 1006, which may be operatively coupled together through a wireless communications network 1008. In an aspect, first device 1002 may comprise a server capable of providing positioning assistance data such as, for example, a base station almanac. First device 1002 may also comprise a server capable of providing an LCI to a requesting MS based, at least in part, on a rough estimate of a location of the requesting MS. First device 1002 may also comprise a server capable of providing indoor positioning assistance data relevant to a location of an LCI specified in a request from an MS. Second and third devices 1004 and 1006 may comprise MSs, in an aspect. Also, in an aspect, wireless communications network 1008 may comprise one or more wireless access points, for example. However, claimed subject matter is not limited in scope in these respects.

First device 1002, second device 1004 and third device 1006, as shown in FIG. 10, may be representative of any device, appliance or machine that may be configurable to exchange data over wireless communications network 1008. By way of example but not limitation, any of first device 1002, second device 1004, or third device 1006 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1002, 1004, and 1006, respectively, may comprise one or more of a base station almanac server, a base station, or an MS in accordance with the examples described herein. For example, second device may comprise a server or AP, though claimed subject matter is not so limited.

Similarly, wireless communications network 1008, as shown in FIG. 10, is representative of one or more communication links, processes, or resources configurable to support the exchange of data between at least two of first device 1002, second device 1004, and third device 1006. By way of example but not limitation, wireless communications network 1008 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1006, there may be additional like devices operatively coupled to wireless communications network 1008.

It is recognized that all or part of the various devices and networks shown in system 1000, and the processes and methods as further described herein, may be implemented using or otherwise including hardware, firmware, software, or any combination thereof.

Processing unit 1020 is representative of one or more circuits configurable to perform at least a portion of a data computing procedure or process. By way of example but not limitation, processing unit 1020 may include one or more processors, controllers, microprocessors, microcontrollers, application specific integrated circuits, digital signal processors, programmable logic devices, field programmable gate arrays, and the like, or any combination thereof. In one embodiment, processing unit 1020, for example, may perform processes 600, 700, and/or 800, or a portion thereof, for example one or more of blocks 610-670, 710-730, and/or 810-830.

Memory 1022 is representative of any data storage mechanism. Memory 1022 may include, for example, a primary memory 1024 or a secondary memory 1026. Primary memory 1024 may include, for example, a random access memory, read only memory, etc. While illustrated in this example as being separate from processing unit 1020, it should be understood that all or part of primary memory 1024 may be provided within or otherwise co-located/coupled with processing unit 1020.

Secondary memory 1026 may include, for example, the same or similar type of memory as primary memory or one or more data storage devices or systems, such as, for example, a disk drive, an optical disc drive, a tape drive, a solid state memory drive, etc. In certain implementations, secondary memory 1026 may be operatively receptive of, or otherwise configurable to couple to, a computer-readable medium 1040. Computer-readable medium 1040 may include, for example, any non-transitory medium that can carry or make accessible data, code or instructions for one or more of the devices in system 1000. Computer-readable medium 1040 may also be referred to as a storage medium.

Second device 1004 may include, for example, a communication interface 1030 that provides for or otherwise supports the operative coupling of second device 1004 to at least wireless communications network 1008. By way of example but not limitation, communication interface 1030 may include a network interface device or card, a modem, a router, a switch, a transceiver, and the like.

Second device 1004 may include, for example, an input/output device 1032. Input/output device 1032 is representative of one or more devices or features that may be configurable to accept or otherwise introduce human or machine inputs, or one or more devices or features that may be configurable to deliver or otherwise provide for human or machine outputs. By way of example but not limitation, input/output device 1032 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more MSs may communicate with a femto cell via a code division multiple access ("CDMA") cellular communication protocol, for example, and the femto cell may provide the MS access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

An access point (AP) may comprise a land-based wireless transmitter that allows an MS, among other wireless devices, to connect to a wired network using Wi-Fi, Bluetooth, or any of a number of other standards, for example. In one implementation, an AP may comprise a personal area network transceiver such as Bluetooth or Zigbee transceivers, for example. In another implementation, an AP may comprise a femto cell, and both terms "AP" and "femto cell" may be used interchangeably unless otherwise indicated. Further, an AP may comprise a base station. In still another implementation, an AP may comprise a wireless network access point, and both terms "AP" and "wireless network access point" may be used interchangeably unless otherwise indicated wireless network access point. For example, a wireless network access point may comprise a network access point to allow one or more MSs to access wireless services, though claimed subject matter is not limited in this respect. A plurality of APs may be placed in a variety of known locations in an area such as an office building, shopping mall, suburban or urban area, and so on.

In some implementations, an indoor navigation system may selectively provide assistance information to an MS to facilitate and/or enable location services. Such assistance information may include, for example, information to facilitate measurements of ranges to wireless access points at known fixed locations. For example, "radio heatmap" data indicating expected received-signal-strength-indicator (RSSI) values or round-trip times (RTT) associated with access points may enable an MS to associate signal measurements with locations in an indoor area. Additionally, such assistance data may also include routeability information indicative of feasible/navigable paths in an indoor area covered by a digital map.

In a particular implementation, assistance information may be provided to an MS from a local server through wireless communication links. The MS may then locally store received assistance information in a local memory. It should be understood, however, that in larger indoor areas with multiple access points and feasible routes, such assistance information may be quite voluminous so as to tax available bandwidth in wireless communication links and data storage space on mobile stations.

RSSI or RTT values measured from an acquired transmission signal may comprise parameters that correspond to signal loss and may indicate a distance traveled by the transmission signal. For example, RTT may increase as the travel distance of a signal increases. In another example, RSSI may decrease as the travel distance of a signal increases. Signal loss, for example, may comprise exponential or linear signal degradation, though claimed subject matter is not so limited.

A radio heatmap may comprise a collection of radio heatmap values corresponding to expected RSSI or RTT values at particular locations (e.g., grid points) represented by the radio heatmap. For example, a radio heatmap may comprise heatmap values individually corresponding to particular grid points or relatively small areas of a region represented by a map of the region. Such a map may comprise a plurality of electronic signals representative of physical locations of a region and expected RSSI or RTT values for the physical locations. In a particular example, an RSSI heatmap of a shopping mall or office building may comprise a map of the shopping mall or office building including expected RSSI measurements for various locations (e.g., grid points) of the shopping mall or office building.

According to an implementation, assistance information may be provided to an MS in a compressed format. For example, such assistance information may be provided as metadata along with metadata included in a digital map. Here, grid points may be laid over locations in an indoor interval at uniform spacing (e.g., two-foot separation of neighboring grid points). Heatmap or connectivity information may be provided for individual grid points in metadata organized by rows, for example. In one implementation, a single row may include values for RSSI, RSSI variances (e.g., standard deviation or other uncertainty characteristics of RSSI values), RTT, and RTT variances for associated access points. Here, the access points may be represented by their MAC ID addresses, for example. In one particular implementation, an RSSI heatmap value and associated variance may be represented by one byte each while a delay heatmap value and associated variance may be represented by two bytes each, though claimed subject matter is not limited in this respect. Additionally, a single field may indicate connectivity (i.e., a feasible path) with adjoining grid points (e.g., Boolean 1 or 0 to indicate whether there is connectivity with an associated grid point). Accordingly, heatmap data indicating expected RSSI or RTT values associated with access points may enable an MS to associate signal measurements with locations in an indoor area. By matching measured RSSI or RTT values of acquired signals marked with particular MAC IDs with expected RSSI or RTT values for signals marked by these particular MAC IDs at a specific location, the location of the MS may be inferred to be at the specific location.

In one implementation, an MS may determine RTT values by transmitting a probe signal and measuring an elapsed time until the MS receives an acknowledging response from one or more access points. For example, an MS may identify individual access points using a MAC ID of the individual access points. An MS may infer its distance to a particular access point based, at least in part, on an RTT value comprising the elapsed time between probe signal transmission and a probe signal response from the particular access point. Such an elapsed time may comprise travel time of the probe signal and the probe signal response in addition to a process delay at the access point. For example, such a process delay may include a time that it takes for an access point to receive a probe signal and to process and transmit a probe response signal. In some cases, RTT values may be affected by multi-path signals, wherein an MS may receive a probe response signal from an access point via more than one path. In such a case, different RTT values may arise for different signal paths. In one implementation, the shortest signal path (e.g., the smallest RTT value) or the strongest (e.g., highest signal amplitude) received probe signal may be considered to be associated with a line-of-sight path, which an MS may use to infer distance to an access point.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
capturing an image of an indoor portion of a building utilizing an imaging sensor of a mobile station;
storing output signal values from said imaging sensor of said mobile station;
extracting linear features from said image of said indoor portion of said building;
determining a topological representation of said indoor portion based, at least in part, on positions or quantity of said linear features in said image;
selecting one or more stored topological representation from among a plurality of stored topological representations of areas of said building;
determining that a topological representation from said captured image corresponds to two or more indoor positions of said areas of said building; and
in response to said determining that said topological representation of said captured image corresponds to said two or more indoor positions, acquiring one or more wireless signals to resolve between or among said two or more indoor positions based, at least in part, on a signal strength or a travel time, or a combination thereof, of said one or more wireless signals.

2. The method of claim 1, wherein said indoor portion of said building comprises a hallway or corridor.

3. The method of claim 2, wherein said linear features comprise four or more lines converging to a vanishing point in said image.

4. The method of claim 3, wherein said linear features further comprise one or more paired lines between two of said converging lines, and further comprising associating said one or more paired lines to one or more doorways, respectively, wherein said determined representation is based, at least in part, on said one or more doorways.

5. The method of claim 1, further comprising:
resolving said two or more indoor positions of said areas of said building based, at least in part, on a probability, likelihood, or confidence value being above a threshold.

6. The method of claim 1, further comprising:
annotating said image with a rotation vector based, at least in part, on an inertial sensor or gravitometer.

7. The method of claim 1, wherein said topological representation corresponds to said linear features in three-dimensions.

8. The method of claim 1, wherein selecting said stored topological representation from among said plurality of stored topological representations comprises selecting said stored topological representation based, at least in part, on a rough location of said mobile station.

9. The method of claim 1, further comprising:
determining a heading of said mobile station, and comparing said topological representation to said selected stored topological representation of said building is based, at least in part, on said heading.

10. The method of claim 1, further comprising:
correcting an estimated position of said mobile station based, at least in part, on said resolved position.

11. An apparatus comprising:
means for capturing, by a mobile station, an image of an indoor portion of a building;
means for extracting linear features from said image of said indoor portion of said building;
means for determining a topological representation of said indoor portion based, at least in part, on positions or quantity of said linear features in said image;
means for selecting a stored topological representation from among a plurality of stored topological representations of particular areas of said building;
means for determining that a topological representation from said captured image corresponds to two or more indoor positions of said areas of said building; and
means for acquiring, in response to said means for determining that a topological from said captured image corresponds to two or more indoor positions, one or more wireless signals to resolve between or among said two or more indoor positions based, at least in part, on a signal strength or a travel time, or a combination thereof, of said one or more wireless signals.

12. The apparatus of claim 11, wherein said indoor portion of said building comprises a hallway or corridor.

13. The apparatus of claim 12, wherein said linear features comprise four or more lines converging to a vanishing point in said image.

14. The apparatus of claim 13, wherein said linear features further comprise one or more paired lines between two of said converging lines, and further comprising means for associating said one or more paired lines to one or more doorways, respectively, wherein said determined representation is based, at least in part, on said one or more doorways.

15. The apparatus of claim 11, further comprising:
means for resolving between or among said two or more indoor positions based, at least in part, on a probability, likelihood, or confidence value being above a threshold.

16. The apparatus of claim 11, further comprising:
means for annotating said image with a rotation vector based, at least in part, on an inertial sensor or gravitometer.

17. The apparatus of claim 11, wherein said topological representation corresponds to said linear features in three-dimensions.

18. The apparatus of claim 11, further comprising:
means for determining a heading of said mobile station, and further comprising comparing said topological representation to said selected stored topological representation of said building based, at least in part, on said heading.

19. The apparatus of claim 11, further comprising:
means for correcting an estimated position of said mobile station based, at least in part, on said resolved position.

20. An apparatus comprising:
a camera; and
one or more processing units configured to:
capture an image of an indoor portion of a building using said camera at a mobile station;
extract linear features from said image of said indoor portion of said building;
determine a topological representation of said indoor portion based, at least in part, on positions or quantity of said linear features in said image;
select a stored topological representation from among a plurality of stored topological representations of particular areas of said building;
determine that a topological representation from said captured image is to correspond to two or more indoor positions of said areas of said building; and
in response to said determining that said topological representation of said captured image corresponds to said two or more indoor positions, acquiring one or more wireless signals to resolve between or among said two or more indoor positions based, at least in part, on a signal strength or a travel time of, or a combination thereof, said one or more wireless signals.

21. The apparatus of claim 20, wherein said indoor portion of said building comprises a hallway or corridor.

22. The apparatus of claim 21, wherein said linear features comprise four or more lines converging to a vanishing point in said image.

23. The apparatus of claim 22, wherein said linear features further comprise one or more paired lines between two of said converging lines, wherein said one or more processing units are further configured to associate said one or more paired lines to one or more doorways, respectively, and wherein said determined representation is based, at least in part, on said one or more doorways.

24. The apparatus of claim 20, wherein said one or more processing units are further configured to resolve said two or more indoor positions based, at least in part, on a probability, likelihood, or confidence value being above a threshold.

25. The apparatus of claim 20, wherein said one or more processing units are further configured to annotate said image with a rotation vector based, at least in part, on an inertial sensor or gravitometer.

26. The apparatus of claim 20, wherein said topological representation corresponds to said linear features in three-dimensions.

27. The apparatus of claim 20, wherein said one or more processing units are further configured to initialize a particle filter based, at least in part, on said two or more indoor positions.

28. The apparatus of claim 20, wherein said one or more processing units are further configured to determine a heading of said mobile station, and comparing said topological representation to said selected stored topological representation of said building based, at least in part, on said heading.

29. The apparatus of claim 20, wherein said one or more processing units are further configured to correct an estimated position of said mobile station based, at least in part, on said position fix.

30. A non-transitory storage medium comprising instructions stored thereon that are executable by a special purpose computing device to:
  capture, using a camera at a mobile station, an image of an indoor portion of a building;
  extract linear features from said image of said indoor portion of said building;
  determine a topological representation of said indoor portion based, at least in part, on positions or quantity of said linear features in said image;
  select a stored topological representation from among a plurality of stored topological representations of particular areas of said building;
  determine that a topological representation from said captured image corresponds to two or more indoor positions of said areas of said building; and
  in response to said determining that said topological representation of said captured image corresponds to said two or more indoor positions, acquire one or more wireless signals to resolve between or among said two or more indoor positions based, at least in part, on a signal strength or a travel time or combination thereof, of said one or more wireless signals.

* * * * *